(12) United States Patent
Merrifield et al.

(10) Patent No.: US 9,002,885 B2
(45) Date of Patent: Apr. 7, 2015

(54) MEDIA PLAYBACK IN A VIRTUAL ENVIRONMENT

(75) Inventors: Lane Merrifield, Kelowna (CA); Raul Guerra, Glendale, CA (US); Michael P. Yingling, Kelowna (CA)

(73) Assignee: Disney Enterprises, Inc., Burbank, CA (US)

( * ) Notice: Subject to any disclaimer, the term of this patent is extended or adjusted under 35 U.S.C. 154(b) by 1070 days.

(21) Appl. No.: 12/884,070

(22) Filed: Sep. 16, 2010

(65) Prior Publication Data

US 2012/0072451 A1 Mar. 22, 2012

(51) Int. Cl.
*G06F 17/30* (2006.01)
*A63F 13/40* (2014.01)
*A63F 13/30* (2014.01)

(52) U.S. Cl.
CPC ............... *A63F 13/10* (2013.01); *A63F 13/12* (2013.01); *A63F 2300/535* (2013.01); *A63F 2300/8047* (2013.01); *A63F 2300/8082* (2013.01)

(58) Field of Classification Search
USPC ......... 707/770, 771, 722; 463/1, 2, 31, 32, 33
See application file for complete search history.

(56) References Cited

U.S. PATENT DOCUMENTS

| 7,708,643 | B2 * | 5/2010 | Allard et al. ................... 463/43 |
|---|---|---|---|
| 7,886,045 | B2 * | 2/2011 | Bates et al. .................. 709/224 |
| 7,890,623 | B2 * | 2/2011 | Bates et al. .................. 709/224 |
| 8,382,589 | B2 * | 2/2013 | Koo .............................. 463/35 |
| 8,463,875 | B2 * | 6/2013 | Katz et al. ..................... 709/219 |
| 2002/0137565 | A1 * | 9/2002 | Blanco ........................... 463/46 |
| 2003/0227473 | A1 * | 12/2003 | Shih et al. ..................... 345/716 |
| 2004/0005923 | A1 * | 1/2004 | Allard et al. ................... 463/35 |
| 2005/0064935 | A1 * | 3/2005 | Blanco ........................... 463/35 |
| 2006/0112808 | A1 * | 6/2006 | Kiiskinen et al. .............. 84/484 |
| 2007/0179867 | A1 * | 8/2007 | Glazer et al. .................. 705/27 |
| 2008/0090562 | A1 * | 4/2008 | Divis et al. ................. 455/422.1 |
| 2008/0250315 | A1 | 10/2008 | Eronen et al. |
| 2009/0037822 | A1 | 2/2009 | Kandekar et al. |
| 2009/0055426 | A1 * | 2/2009 | Kalasapur et al. ............ 707/102 |
| 2009/0088255 | A1 * | 4/2009 | Meyers et al. .................. 463/42 |
| 2009/0172146 | A1 * | 7/2009 | Bates et al. .................. 709/224 |
| 2009/0172538 | A1 * | 7/2009 | Bates et al. ................... 715/706 |
| 2010/0018382 | A1 * | 1/2010 | Feeney et al. .................. 84/615 |
| 2011/0007079 | A1 * | 1/2011 | Perez et al. .................. 345/473 |
| 2012/0071240 | A1 * | 3/2012 | Koo .............................. 463/35 |

* cited by examiner

*Primary Examiner* — Jean M Corrielus
(74) *Attorney, Agent, or Firm* — Patterson + Sheridan LLP (57) ABSTRACT

A framework is provided for selecting media files for playback in a computer game. In one embodiment, user actions in the computer game are monitored. Further, user characterizations of media files may also be retrieved. The user characterizations may be input by a plurality of users via a media player application. A media file may be then selected for playback based on the monitored user actions and retrieved user characterizations. The selected media file may better suit an emotional experience of a user playing the computer game.

20 Claims, 7 Drawing Sheets

MEDIA PLAYBACK IN A VIRTUAL ENVIRONMENT

BACKGROUND

1. Field

Embodiments of the invention relate generally to computer games and, more particularly, to selecting media for playback in computer games.

2. Description of the Related Art

In-home computer games and computer game systems have become mainstream consumer products. Such systems allow a user to play computer games at home on a standard television set or on a handheld device that the user may carry with the user. Typically, in-home computer game systems include a console that reads computer game code from a storage device (e.g., a CD-ROM disc or cartridge) and transmits video to a television screen for display. Computer game systems also typically include a controller device that allows the user playing the computer game to provide inputs to the computer game to manipulate the characters or other features of the game.

Generally, the designer of the computer game will create a computer-rendered world in which the computer game characters or other features may interact. For example, many computer games allow a player to maneuver an avatar (e.g., a sprite or character) through a computer-rendered world to accomplish a set of tasks. Other computer games allow the player to control a vehicle or airplane through a computer-rendered world. In two-dimensional computer games, characters may move in two dimensions (e.g., up and down on the screen or left and right), while in three-dimensional computer games, characters are typically allowed to move in three dimensions in the computer-rendered world.

SUMMARY

Embodiments of the invention provide a computer-implemented method, computer-readable storage medium, and system for performing an operation that includes monitoring activity of a user in a virtual environment. The operation also includes retrieving user characterizations of a plurality of media files external to an application providing the virtual environment, wherein the user characterizations are input by a plurality of users each using a respective media player application for managing the plurality of media files and the user characterizations, and wherein the respective media player application is separate from an application that provides the virtual environment. The operation also includes selecting a media file from the plurality of media files for playback in the virtual environment, based on at least the monitored activity of the user and the retrieved user characterizations.

Embodiments of the invention also provide a computer-implemented method, computer-readable storage medium, and system for performing an operation that includes providing a virtual environment for a user. The operation also includes outputting, from a first media source internal to the virtual environment, a first media file for playback for the user. The operation also includes providing a user interface for controlling media playback, wherein the user interface is integrated into a virtual object in virtual environment. The operation also includes receiving, from the user and via the user interface, a request to play a second media file from a second media source external to the virtual environment. The operation also includes outputting the second media file for playback in the virtual environment, responsive to the request.

Embodiments of the invention also provide a computer-implemented method for performing an operation that includes selecting a media file from the plurality of media files for playback in a virtual environment, based on at least the monitored activity of a user and user characterizations of a plurality of media files. The operation may also include outputting the media file for playback in the virtual environment. The operation may also include providing a user interface for controlling media playback, wherein the user interface is integrated into a virtual object in virtual environment.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally provide a framework for selecting a media file for playback in a virtual environment, based on user activity in the computer game and/or user characterization of media files. The media files may include any type of multimedia content, such as audio, video, images, text, and/or any combination thereof. To facilitate understanding of the disclosure, examples are given with reference to audio content such as soundtracks. However, those skilled in the art will recognize that the examples are merely exemplary and are not intended to be limiting of the disclosure. In particular, embodiments for selecting video, images, text, and other content for playback in a virtual environment are broadly contemplated by the disclosure.

In one embodiment, the audio content selected for playback in the virtual environment may include musical scores (as opposed to sound effects) that provide background music for the computer game. In one embodiment, an application that provides the virtual environment (e.g., a computer game) monitors user activity occurring in the virtual environment. The application also retrieves one or more media profiles. The media profiles include data provided by one or more users, characterizing a plurality of soundtracks. The one or more users may not necessarily include the user of the application. In other words, user characterizations may influence soundtrack selection for the user making the characterization and for other users of the application. The application then selects one of the plurality of soundtracks to play back, based on the monitored activity and/or the retrieved media profiles. Advantageously, by using the techniques disclosed herein, the application may select a soundtrack that is better suited to the emotional experience of the user in the virtual environment. Further, the application may provide an in-game interface for the user to control playback of the soundtracks. For example, the in-game interface may be integrated into a dashboard of a virtual car in the application. Accordingly, the user may further customize the playback of soundtracks in the application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1A:
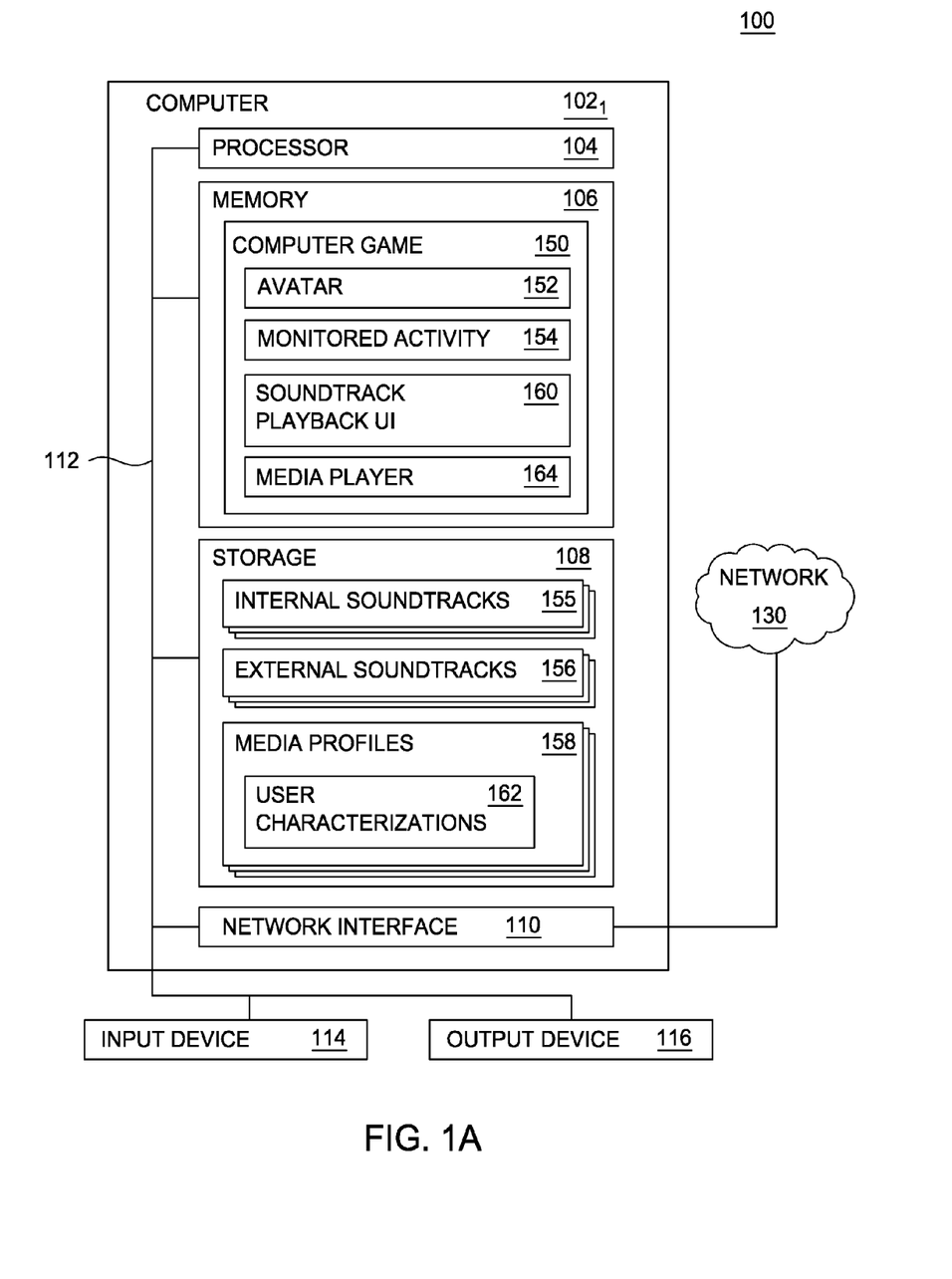
FIGS. 1A-1B are block diagrams illustrating a system for selecting soundtracks for playback in a computer game, according to one embodiment of the invention.

FIG. 1A is a block diagram illustrating a system 100 for selecting soundtracks for playback in the computer game, according to one embodiment of the invention. The system 100 includes a computer 1021. The computer 1021 may be connected to other computers via a network 130. In general, the network 130 may be a telecommunications network and/or a wide area network (WAN). In a particular embodiment, the network 130 is the Internet.

The computer 1021 generally includes a processor 104 connected via a bus 112 to a memory 106, a network interface device 110, a storage 108, an input device 114, and an output device 116. The computer 1021 is generally under the control of an operating system 152. Examples of operating systems 152 include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 1021 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 1021. For example, a keyboard, keypad, light pen, touch-screen, track-ball, or speech recognition unit, audio/video player, and the like may be used. The output device 116 may be any device for providing output to a user of the computer 1021. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a computer game) or related data available in the cloud. For example, the computer game described herein could execute on a computing system in the cloud, thereby allowing users to access the game from any computing system attached to a network connected to the cloud (e.g., the Internet). Similarly, the soundtracks described herein could be streamed to users by a music streaming service executing on a computing system in the cloud.

As shown, the memory 106 of the computer 1021 includes a computer game 150 and a media player 164, and the storage 108 of the computer 1021 includes internal soundtracks 155 and external soundtracks 156. The internal soundtracks 155 refer to audio assets of the computer game 150 that are provided as background music for the computer game 150. The external soundtracks 156 refer to audio media that are not assets of the computer game 150 and that are accessed independently of the computer game 150 (e.g., via the media player 164). In one embodiment, the computer game 150 provides a virtual environment that includes a user-controlled avatar 152. The computer game 150 also provides soundtrack playback user interface (UI) 160. The soundtrack playback UI 160 allows a user playing the computer game 150 to control playback of the soundtracks 152 in the computer game 150. Depending on the embodiment, the computer game 150 may belong to one or more of the following genres: puzzle, action, adventure, arcade, role-playing, simulation, sports, racing, fighting, shooting, shooter, and strategy.

In one embodiment, the media player 164 refers to an application for organizing and playing back the external soundtracks 156. Depending on the embodiment, the media player 164 may be any application that plays back digital media (e.g., the external soundtracks 156) and that is separate from the application that provides the virtual environment (e.g., the computer game 150). Depending on the embodiment, the media player 164 is not a computer game and/or does not provide the (or any) virtual environment for the user. In a typical embodiment, the media player 164 includes controls for organizing the external soundtracks 156, such as renaming a filename or a song title of a soundtrack. The media player 164 may also include playback controls, such as starting playback of a soundtrack, stopping or pausing playback of a soundtrack, skipping to a next soundtrack, etc. The media player 164 may also include controls for organizing soundtracks, such as into folders, categories, playlists, etc. The external soundtracks 156 may be stored locally or streamed via the network 130. Further, the media player 164 may create and/or manage media profiles 158 for the external soundtracks 156. The media profiles 158 include characterizations of the external soundtracks 156.

In one embodiment, characterizations refer to any kind of user-provided attribute associated with one or more of the external soundtracks 156, including preferential indications (e.g., like or dislike, ratings, popularity indicators, etc.), freeform text comments, relationship attributes indicating a relationship to other soundtracks, genre identifiers, emotional impact indicators (i.e. an indication as to whether the song is sad, happy, exciting, etc.), and the like. The characterizations may be provided by one or more users, such as a user of the media player 164 and/or any other user of a media player on the network 130. In this way, an overall characterization of a soundtrack may be influenced by a plurality of users who, while not necessarily directly collaborating, have a collaborative effect on the overall characterization. Although the external soundtracks 156 and the media profiles 158 are shown as being stored on the storage 108, depending on the embodiment, some or all of the external soundtracks 156 and/or media profiles 158 may be stored in the cloud (e.g., as part of a music streaming service). Alternatively, the one or more users may also provide the characterizations via a graphical user interface (GUI) of the computer game 150 (rather than through the media player 164). However, in at least some embodiments, the computer game 150 does not accept the characterizations from the user; instead, only the media player 164 accepts and stores the characterizations for the user. One example of the media player 164 is iTunes® from Apple, Inc. of Cupertino, Calif.

Figure 1B:
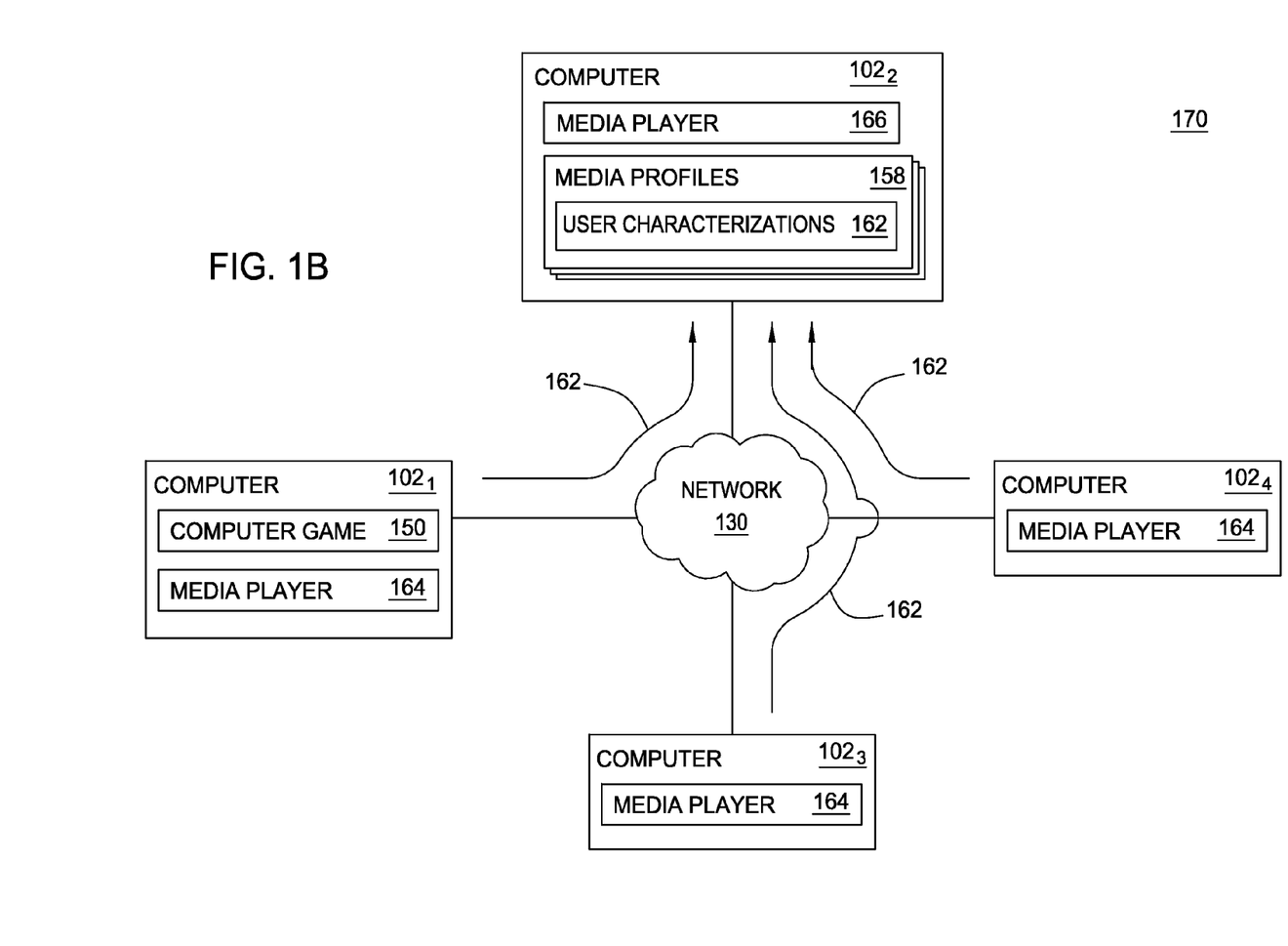

FIG. 1B is a block diagram illustrating a networked system 170 for selecting soundtracks for playback in the computer game 150, according to one embodiment of the invention. As shown, the networked system 170 includes a computer 1022 executing a media server 166. The media server 166 receives user characterizations 162 from media players 164 executing on other computers 1021, 1023, 1024 on the network 130. Depending on the embodiment, the media players 164 may be instances of a single media player application or may be different media player applications altogether (e.g., that conform to one or more protocols used by the media server 166 for transmitting user characterizations and/or soundtracks). The media server 166 manages and stores the received user characterizations 162 and may send one or more of the user characterizations 162 to a computer game 150, responsive to a request from the computer game 150. To this end, the media server 166 may expose an application programming interface (API) to the computer game 150, where the API allows the computer game 150 to retrieve user characterizations 162 based on supplied criteria. Alternatively, the computer game 150 may use security credentials to access a data source (e.g., a relational database) storing the user characterizations 162. Still alternatively, the computer game 150 receives a bulk data transfer (e.g., a data dump) at a predefined schedule, where the bulk data transfer includes the user characterizations 162.

Advantageously, the experience of a user playing the computer game 150 may be influenced by user characterizations from other users, who need not necessarily also play the computer game 150. Depending on the embodiment, aside from sharing user characterizations, the media server 166 may provide various media services such as a media store where users can purchase media files, a search engine for finding desired media files, and/or a media streaming service for the media player 164 to play back streamed media files. The media server 166 may also generate inferred characterizations using the user characterizations. An inferred characterization of a soundtrack describes a qualitative or quantitative aspect of the soundtrack and is not input explicitly by a user but is derived from the user characterizations. For example, if a predefined threshold count or percentage of users have characterized a soundtrack as being suited to a sad mood, the media server 166 may assign an inferred, overall characterization of the soundtrack as being suited to a sad mood (e.g., for all users).

Figure 2:
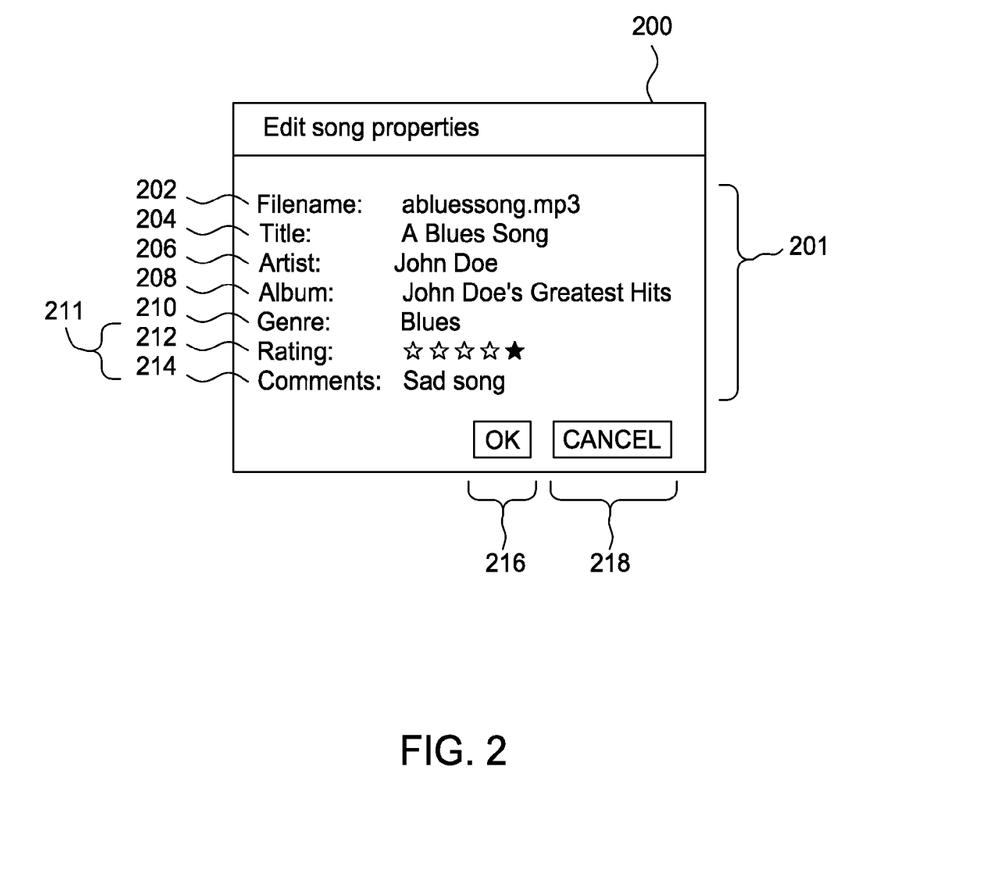
FIG. 2 illustrates a GUI screen of a media player, according to one embodiment of the invention.

FIG. 2 illustrates a GUI screen 200 of the media player 164, according to one embodiment of the invention. A user of the media player 164 provides and/or modifies properties 201 of a soundtrack using the GUI screen 200. As shown, the properties 201 include a filename 202 of the soundtrack, a title 204 of the soundtrack, an artist 206 of the soundtrack, an album 208 that the soundtrack belongs to, a genre 210 of the soundtrack, and a user-provided characterization 211 of the soundtrack. The user-provided characterization 211 includes a rating 212 for the soundtrack and comments 214 on the soundtrack. The user may click an "OK" button 216 to apply changes. Alternatively, the user may click on a "Cancel" button 218 to exit the GUI screen 200 without applying changes. In this particular example, for the soundtrack "A Blues Song", the user of the media player 164 provides a rating of four out of five stars and a comment that characterizes the soundtrack as a sad song. In response the user clicking the "OK" button 216, the media player creates a media profile 158 for the soundtrack and stores at least the user-provided characterization as part of the media profile 158. In addition to the user-provided characterization, the media profile 158 may also include one or more fields not shown in FIG. 2, e.g., a playback frequency, a date and time the soundtrack was last played back, a soundtrack identifier, an artist identifier, an album identifier, a genre identifier, etc. In one embodiment, the media profile 158 is published to the media server 166, which can then make all or part the profile publically available to other users.

Having created one or more profiles 158, the information contained therein may be used to influence selection of music for playback in a virtual environment, such as the virtual environment provided by the computer game 150. In one embodiment, the computer game 150 uses the media profile (or profiles) to select a soundtrack for playback to better suit an emotional mood of a user playing the computer game 150. To this end, the computer game 150 first determines the mood of the user playing the game. Emotional moods may include, without limitation, happiness, sadness, excitement, anger, frustration, confusion, surprise, contempt, indifference, etc.

In one embodiment, the determination of the emotional mood may be made by analyzing various contextual information such as statements made and/or actions taken by the avatar of the user, who the user is interacting with in the virtual world, the particular scene or location in the virtual environment that the user is in, a typing speed of the user, the time of day, and/or a geographic location of the user (e.g., as determined by an Internet Protocol (IP) address of the user, cell tower triangulation, global positioning system (GPS), etc.). Additionally or alternatively, various biometrics (such as, blood pressure, heart rate, galvanic skin response, etc.) may be monitored in order to infer the emotional mood of the user. The mood of the user may also be determined explicitly, e.g., by prompting the user to provide a mood selection from a list of choices. The computer game 150 then selects a soundtrack based on the determined emotional mood and media profiles associated with a plurality of soundtracks. For example, the computer game 150 may select a soundtrack which the user characterization of the respective user profile indicates is suited to the determined emotional mood. The computer game 150 may also take into account ratings of the soundtrack by the user (or by other users). For example, if more than one soundtrack satisfies emotional mood criteria, the computer game 150 may play back the soundtrack with the highest rating. Alternatively, the computer game may generate a playlist using the soundtracks, where the playlist is sorted according to the rating.

In an alternative embodiment, a developer of the computer game 150 may define a plurality of mappings from emotional moods to soundtrack criteria, rather than specific songs. For example, the developer may define a mapping from the emotional mood of "sadness" to a genre of "blues". As another example, the developer may define a mapping from the emotional mood of "happiness" to a listing of artist names, album names, and/or soundtrack names deemed to suit a happy emotional mood. The computer game 150 may select a soundtrack(s) that matches the criteria corresponding to the given emotional mood. The developer of the computer game 150 may also specify other products related to the computer game 150. Then, between playback of soundtracks, the computer game 150 may also play back advertisements to promote the other products.

In one embodiment, the developer may also assign a playback priority to an artist, an album, or a soundtrack. For example, the playback priority may be assigned based on a monetary payment received from an artist (or from a record label associated with the artist). The playback priority of a given soundtrack may influence how often the computer game 150 selects the soundtrack for playback in the computer game 150. The artist may specify one or more options regarding the playback priority. For example, the artist may specify a time slot during which the playback priority is in effect. The artist may also specify that a soundtrack should only be played for an audience of a minimum threshold count of players playing the computer game 150.

Figure 3A:
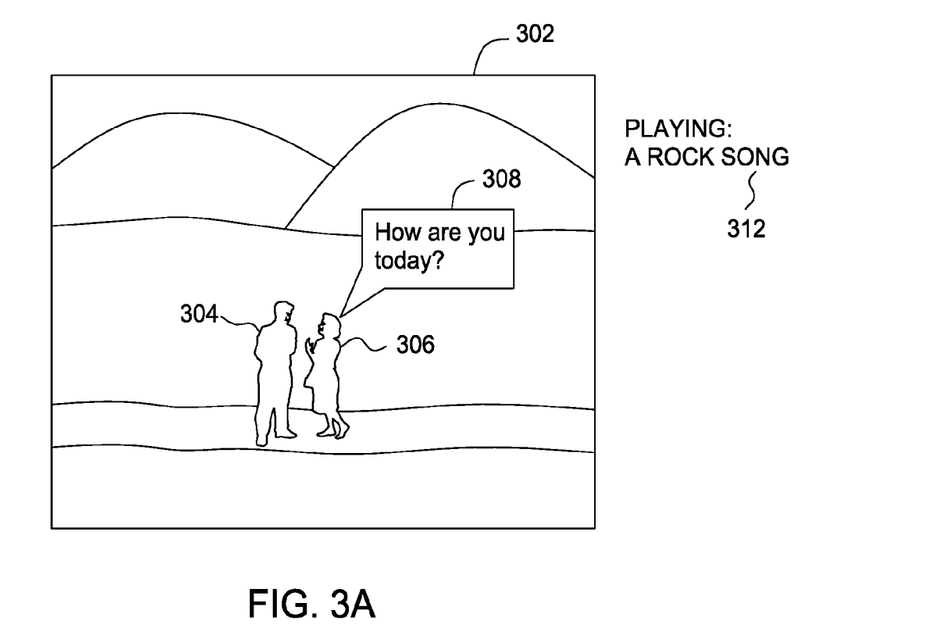
FIGS. 3A-3B illustrate exemplary GUI screens of the computer game, according to one embodiment of the invention.
Figure 3B:
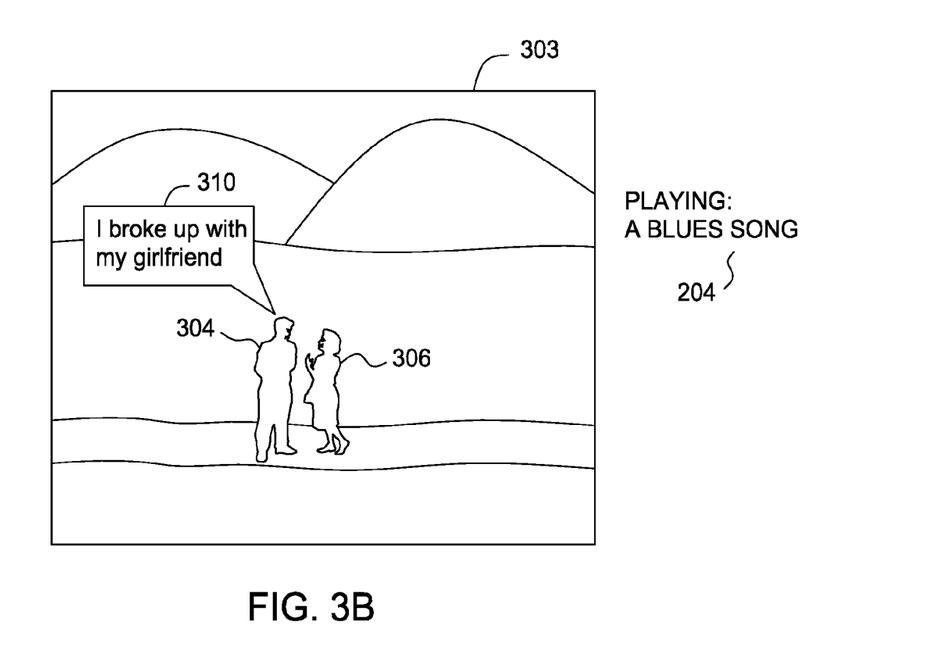

To facilitate understanding of the disclosure, assume that two users playing the computer game 150 are interacting with one another in a scene in the virtual environment. This situation is illustrated by FIGS. 3A-3B which show exemplary GUI screens 302, 303 of the computer game 150 of FIG. 1, according to one embodiment of the invention. The GUI screen 302 of FIG. 3A depicts a scene in a virtual environment provided by the computer game 150. The scene includes a first avatar 304 and a second avatar 306. Each avatar is controlled by a different user playing a respective instance of the computer game 150 (e.g., via the network 130). Suppose the first user, Adam, controls the first avatar 304, and the second user, Bob, controls the second avatar 306. Suppose also that the computer game 150 is playing a rock song 312 to accompany the scene in the virtual environment. In one embodiment, Bob may inquire about the well-being of Adam, using the avatar 306 (as shown in FIG. 3A). In response, Adam may express sadness, using the avatar 304. For instance, using the avatar 304, Adam may input a reply message indicating that Adam is experiencing difficulties in a personal relationship (i.e., in real life and/or in the virtual environment). The reply message may be input using a keyboard, a mouse, a microphone, and/or a game controller, etc. Adam may also express sadness using body language of the avatar 304 in the virtual environment. Adam may control the body language of the avatar using one or more keystrokes defined by the computer game 150 and/or customized by Adam. For example, Adam may control the avatar 304 to frown, cry, hang its head, etc.

Based on the statements made by Adam and/or body language of the avatar 304, the computer game 150 determines that Adam is in a sad emotional mood and that a song (or songs) befitting that mood should be played. To this end, the computer game 150 may take into account information contained in media profiles 158 associated with the available external soundtracks 156. For example, because the media profile 158 associated with the soundtrack "A Blues Song" indicates that the soundtrack may be suited to a sad emotional mood (as shown in FIG. 2), the computer game selects and plays back "A Blues Song" in response to actions of Adam in the virtual environment of the computer game 150. The information in the media profile 158 may have been provided by Adam, other users (such as the users of the computers 1023, 1024), or both. In some embodiments, the computer game 150 plays back "A Blues Song" only upon determining that a predefined threshold count or percentage of users have provided a media profile 158 indicating that the song is suited to a sand emotional mood. Alternatively, the computer game 150 may also take into account predefined mappings between emotional moods and soundtrack criteria, as specified by the developer of the computer game 150. In this case, the computer game 150 identifies soundtrack criteria (e.g., genre of "blues") having a predefined association with the identified mood (sadness, in this case), and then selects a song or playlist of songs that matches the criteria.

In one embodiment, the selected song (i.e., "A Blues Song") is audible only to Adam (and not to Bob). In other words, Bob continues to listen to the rock song 312—or whatever song that Bob was previously listening to when Adam was listening to the rock song 312. In an alternative embodiment, the selected song is audible only to Adam and other avatars who are within the vicinity of Adam (or of the scene, e.g., within a predefined radius). In still another embodiment, the selected song is audible only to Adam and other avatars with whom Adam is interacting (and/or whom Adam has previously designated as friends in the computer game 150). Advantageously, the computer game 150 may play back soundtracks that are better suited to the emotional experiences of the user playing the computer game 150 and without requiring the user to input any soundtrack characterizations via the computer game 150. Accordingly, user satisfaction with the computer game 150 may be improved.

Figure 4:
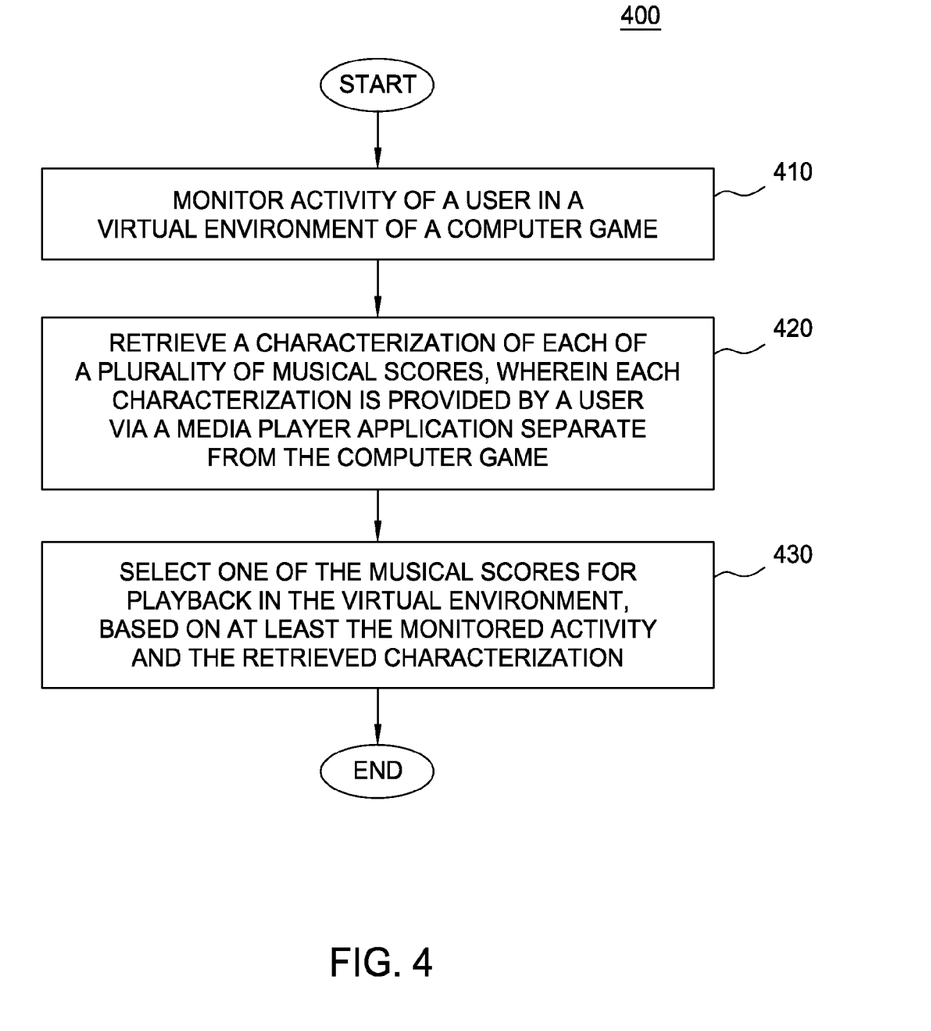
FIG. 4 is a flowchart depicting a method for selecting a soundtrack for playback in a virtual environment of the computer game, according to one embodiment of the invention.

FIG. 4 is a flowchart depicting a method 400 for selecting a soundtrack for playback in a virtual environment of the computer game 150 of FIG. 1, according to one embodiment of the invention. As shown, the method 400 begins at step 410, where the computer game 150 monitors activity of a user in the virtual environment. For example, the computer game 150 may monitor actions of the avatar 304 of Adam (as shown in FIGS. 3A-3B). At step 420, the computer game 150 retrieves characterizations of a plurality of soundtracks external to the computer game 150. For example, the computer game 150 may retrieve a characterization of the soundtrack as being a sad song (as shown in FIG. 2). The characterizations may be input by a plurality of users of a media player application that is separate from the computer game 150.

At step 430, the computer game 150 selects one of the soundtracks for playback in the virtual environment, based on at least the monitored activity and the retrieved characterizations. For example, the computer game 150 may stop playing back a rock song and start playing back a blues song, based on the monitored activity of the avatar 304 of Adam and based on the characterization of the blues song by Adam. As another example, the blues song may have characterized by a user other than Adam. Further, the other user may not necessarily play the computer game 150 but may use a media player (e.g., the media player 164) to input characterizations of soundtracks. After the step 430, the method 400 terminates. Accordingly, by analyzing soundtrack characterizations provided by multiple users and by correlating user actions in the virtual environment with the soundtrack characterizations, the computer game 150 may select soundtracks that are better suited to the emotional experience of the user playing the computer game 150, thereby improving user satisfaction with the computer game 150.

In some cases, the developer of the computer game 150 may desire to provide users of the computer game 150 a seamless mechanism for controlling playback of soundtracks. To this end, the computer game 150 may be configured to integrate a soundtrack playback user interface (UI) into a virtual object in the virtual environment provided by the computer game 150. The virtual object may represent an object in the real world that is typically used for controlling playback of audio content, such as a portable radio. Integrating the soundtrack playback UI into such a virtual object allows the user to control playback of soundtracks in an intuitive manner and without having to execute and/or switch to a separate application for controlling the playback. Put another way, the user may control playback of soundtracks for the computer game 150 without having to temporarily suspend play of the computer game 150. In controlling playback of the soundtracks, the user may issue commands such as rewinding a soundtrack, fast forwarding a soundtrack, pausing a soundtrack, selecting a new soundtrack from the internal soundtracks 155 and/or the external soundtracks 156, etc.

Figure 5:
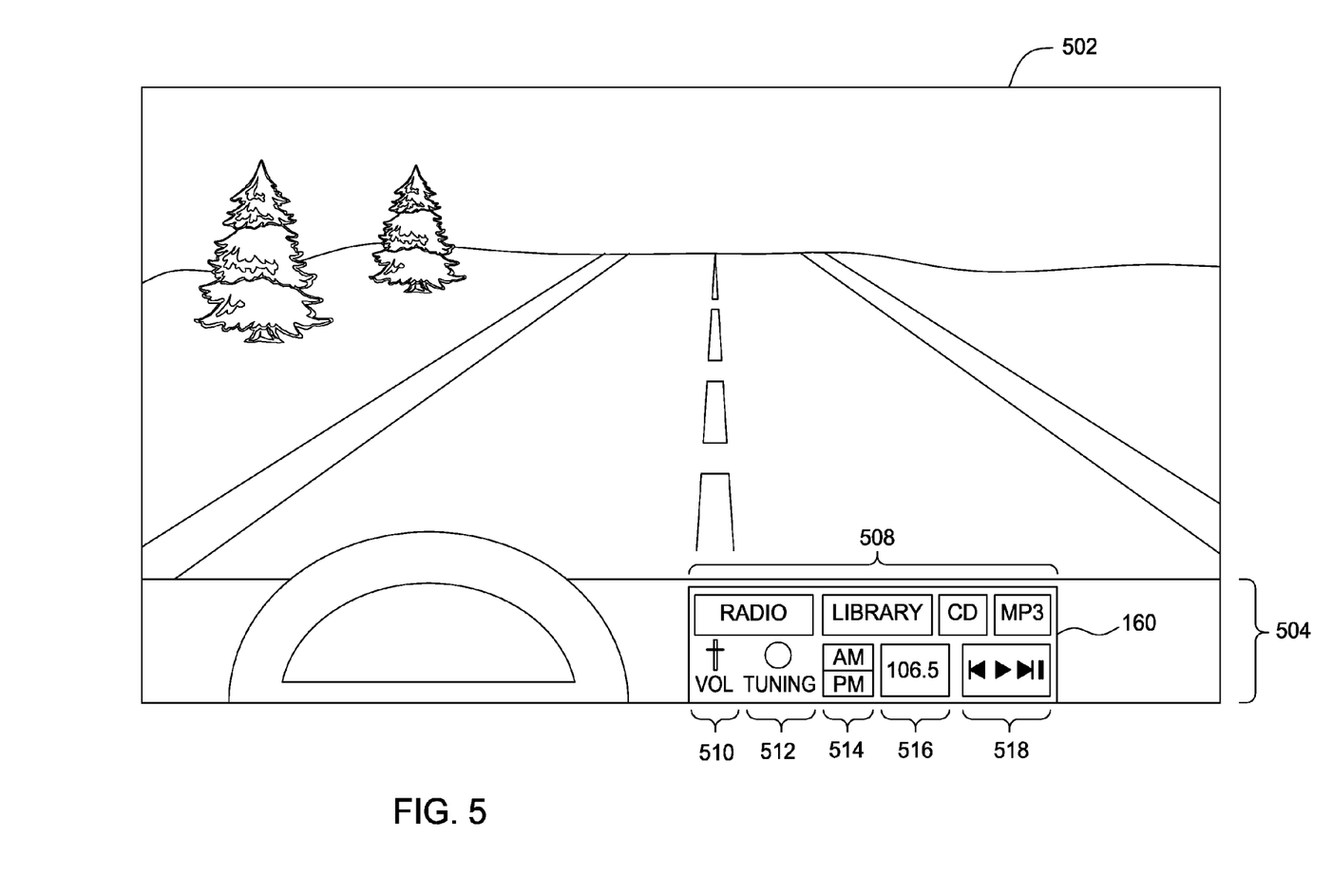
FIG. 5 illustrates a user interface for controlling soundtrack playback in the computer game, according to one embodiment of the invention.

FIG. 5 illustrates an exemplary GUI screen 502 of the computer game 150 of FIG. 1, that includes a soundtrack playback UI 160, according to one embodiment of the invention. As shown, the GUI screen 502 depicts a scene in which an avatar is driving a vehicle in the virtual environment. In this particular example, the soundtrack playback UI 160 is provided as part of a dashboard 504 of the vehicle. In an alternative embodiment, the soundtrack playback UI 160 may be provided as part of a jukebox, portable radio, or boombox in the virtual environment. As shown, the soundtrack playback UI 160 includes an input source control 508, a volume control 510, a tuning control 512, an amplitude modulation/frequency modulation (AM/FM) control 514, a display indicator 516, and playback controls 518.

In one embodiment, the input source control 508 allows the user to select between a plurality of sources for the external soundtracks 156. The sources include a radio mode, a library mode, a CD-ROM mode, and a portable device mode. In the radio mode, the computer game 150 plays back soundtracks streamed from one or more computers in the network 130. The streaming may be organized in the form of one or more radio channels (or stations) by the developer of the computer game 150. A particular radio channel may then be selected by the user via the tuning control 512 and/or by the computer game 150. For example, the developer of the computer game 150 may assign a radio channel that includes soundtracks from a plurality of computer games made by the developer. The developer of the computer game 150 may specify radio channels based on target age group of listeners, genre of music, emotional moods, etc. Advantageously, the user may listen to soundtracks from the plurality of computer games made by the developer—rather than only the soundtracks from the computer game 150.

In the library mode, the computer game 150 plays back soundtracks stored locally on the computer 1021 of the user (e.g., the external soundtracks 156). In the CD-ROM mode, the computer game 150 plays back soundtracks from a CD-ROM drive connected to the computer 1021 of the user. In the portable device mode, the computer game 150 plays back soundtracks from a portable media player connected to the computer 1021 of the user (e.g., via Universal Serial Bus (USB) or Firewire). CD-ROM drives, portable media players, and other external input devices are collectively represented by input device 114 of FIG. 1. Advantageously, this embodiment allows the user playing the computer game 150 to specify a source of soundtracks from within the computer game 150 via the UI 160—i.e., without having to switch to a different application executing on the computer 1021. The computer game 150 may then select soundtracks for playback from the soundtracks available at the specified source. Depending on the embodiment, the soundtrack playback UI 160 may also include a soundtrack control (not shown) that allows the user to select a specific soundtrack for playback (e.g., based on a filename of the soundtrack).

In one embodiment, the volume control 510 allows the user to specify a volume for soundtrack playback. The tuning control and the AM/FM control 514 allow a user to tune to a given radio station (i.e., when the input source control 508 is set to radio mode). The display indicator 516 presents information regarding the soundtrack playback (e.g., the current radio station being played, the current song title being played back, etc.). The playback controls 518 allow the user to replay a previous soundtrack, skip to a next soundtrack, pause/stop/rewind/fast forward playback of the current soundtrack, etc. Of course, the UI 160 shown in FIG. 5 is merely illustrative and other embodiments may have different configurations of control elements.

Figure 6:
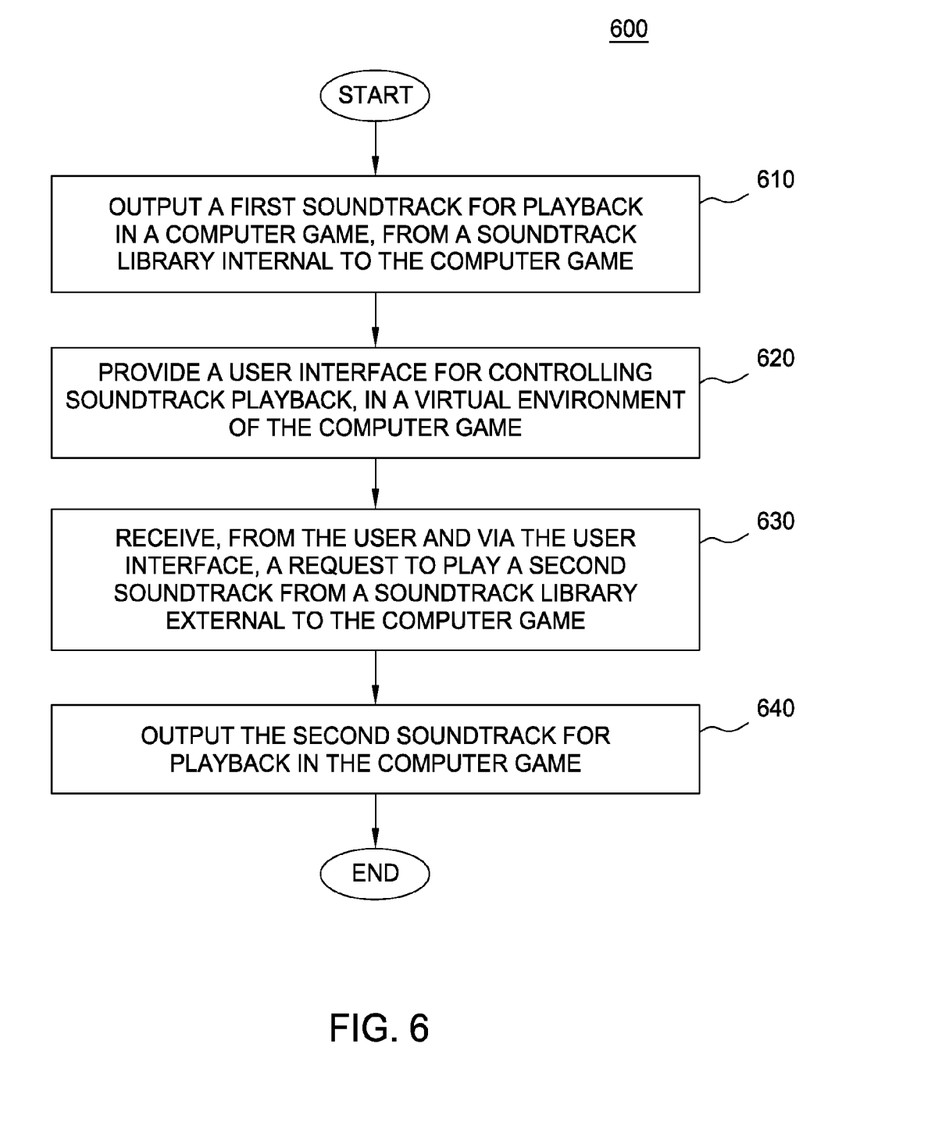
FIG. 6 is a flowchart depicting a method for controlling soundtrack playback in the virtual environment, according to one embodiment of the invention.

FIG. 6 is a flowchart depicting a method 600 for controlling soundtrack playback in the virtual environment of the computer game 150 of FIG. 1, according to one embodiment of the invention. As shown, the method 600 begins at step 610, where the computer game 150 plays back a first soundtrack for a user, from a soundtrack library internal to the computer game 150. For example, the computer game 150 may play back an internal soundtrack 155. At step 620, the computer game 150 provides, as part of a virtual environment of the computer game 150, a user interface for controlling soundtrack playback. For example, the computer game 150 may provide the soundtrack playback UI 160 shown in FIG. 4. At step 630, the computer game 150 receives, from the user and via the user interface, a request to play a second soundtrack from a soundtrack library external to the computer game. In other words, the soundtrack library includes soundtracks (e.g., the external soundtracks 156) that are not necessarily part of the game assets of the computer game 150 and is managed by an application external to the computer game 150. At step 640, the computer game 150 plays back the second soundtrack for the user. After the step 640, the method 600 terminates.

Advantageously, embodiments of the invention provide a framework for selecting soundtracks for a computer game, based on user actions in the computer game and/or user characterizations of soundtracks. The computer game may select soundtracks for playback in the computer game, based on the user actions and/or user characterizations. The soundtrack may be selected to better suit an emotional experience of a user playing the computer game. Accordingly, the computer game may provide a more satisfying and/or compelling gaming experience to the user.

While the foregoing is directed to embodiments of the present invention, other and further embodiments of the invention may be devised without departing from the basic scope thereof, and the scope thereof is determined by the claims that follow.

What is claimed is:

1. A computer-implemented method to tailor selection of media for playback to a user of a virtual environment, based on monitored activity of the user and media characterizations by other users, the computer-implemented method comprising:

outputting a first media file for playback for the user in the virtual environment, wherein the first media file is from a first media source that is part of a virtual world application providing the virtual environment;

monitoring activity of the user in the virtual environment, wherein the virtual environment includes a virtual object having a user interface for controlling media playback without requiring use of any media player application;

retrieving media characterizations of a plurality of media files from a second media source that is not part of the virtual world application, wherein the media characterizations are input by a plurality of users other than the user and each using a respective media player application of one or more media applications for managing the plurality of media files and the media characterizations, wherein the respective media player application is separate from the virtual world application; and     selecting a second media file from the plurality of media files for playback to the user in the virtual environment, by operation of one or more computer processors and based on at least the monitored activity of the user and the retrieved media characterizations, without requiring, from the user, any input specifying the second media file, in order to tailor selection of media for playback to the user in the virtual environment;

wherein playback of the plurality of media files is controllable via the user interface of the virtual object and without requiring use of any of the one or more media player applications, in order to reduce incidence of interruption of use the virtual environment.

2. The computer-implemented method of claim 1, wherein the characterizations comprise at least one of a rating of a media file, a descriptive tag characterizing the media file, a genre identifier for the media file, an indicator of a relationship with another media file, and a playback frequency of the media file.

3. The computer-implemented method of claim 1, wherein the activity of the user comprises a dialogue that includes one or more statements made by the user in the virtual world.

4. The computer-implemented method of claim 1, wherein selection of media is facilitated in order to better suit an emotional state of the user, relative to selecting media not based on both the monitored activity of the user and the characterizations of media by other users;

wherein the activity of the user comprises one or more actions taken by an avatar of the user in the virtual environment, in response to input from the user to the virtual environment, wherein the activity of the user in a given instance comprises a dialogue that includes one or more statements made by the user in the virtual world, wherein the media file is further selected based on a physical location of the user.

5. The computer-implemented method of claim 4, wherein each of the plurality of media files is a distinct musical score and does not include video, wherein the characterizations comprise, in respective instances:

(i) a rating of a media file;
    (ii) a descriptive tag characterizing the media file;
    (iii) a genre identifier for the media file;
    (iv) an indicator of a relationship with another media file; and
    (v) a playback frequency of the media file;

wherein the characterization in a given instance comprises the rating, the descriptive tag, the genre identifier, the indicator of the relationship, and the playback frequency.

6. The computer-implemented method of claim 5, wherein a specified media file is output for playback to the user in the virtual environment responsive to receiving, from the user and via the user interface of the virtual object, a request to play the specified media file, wherein the specified media file is, in respective instances: (i) one of the plurality of media files and (ii) a media file separate from the plurality of media files, wherein the virtual object is a vehicle in the virtual environment, wherein the user interface is integrated into a dashboard of the vehicle.

7. The computer-implemented method of claim 6, wherein the program providing the virtual environment comprises a virtual world application, wherein the specified media file resides on the portable device of the user, that is operatively connected to a computing device executing the virtual world application, wherein the user interface includes an input source control, a volume control, a tuning control, a virtual amplitude modulation/frequency modulation control, a display indicator, and a plurality of playback controls, wherein the virtual environment is of a computer game.

8. The computer-implemented method of claim 7, further comprising:

playing back musical scores from a plurality of distinct computer games other than the computer game, via a predefined, virtual radio channel specified via the dashboard of the vehicle in the virtual environment, wherein the musical scores are not included in the computer game.

9. A computer-implemented method to provide a user interface integrated into a virtual environment and for controlling playback of external media of a user, the computer-implemented method comprising:

providing the virtual environment for the user by a virtual world application;

outputting a first media file for playback for the user, wherein the first media file is from a first media source that is part of the virtual world application;

providing the user interface for controlling media playback, wherein the user interface is integrated into a virtual object in the virtual environment;

receiving, from the user and via the user interface, a request to play a second media file from a second media source that is not part of the virtual world application;

outputting the second media file for playback to the user in the virtual environment, responsive to the request and by operation of one or more computer processors; and     providing media characterizations of a plurality of media files from the second media source external to the virtual environment, wherein the media characterizations are input by a plurality of users other than the user and each using a respective media player application of one or more media applications for managing the plurality of media files and the media characterizations, wherein the respective media player application is separate from the virtual world application, wherein the user interface of the virtual object permits control of media playback without requiring use of any of the one or more media player applications, wherein a media file from the plurality of media files is selected for playback to the user in the virtual environment, based on monitored activity of the user and the provided media characterizations, without requiring, from the user, any input specifying the media file.

10. The computer-implemented method of claim 9, wherein the second media source is managed by a first media player application separate from the virtual environment, wherein the user is permitted to control playback of the second media source without having to use the first media player application, in order to reduce incidence of interruption of use the virtual environment by the user.

11. The computer-implemented method of claim 9, wherein the second media source resides on a portable media player device of the user, operatively connected to a computing device executing the virtual world application.

12. The computer-implemented method of claim 9, wherein the virtual object is a vehicle in the virtual environment, wherein the user interface is integrated into a dashboard of the vehicle.

13. A computer-implemented method to tailor selection of media for playback to a user of a virtual environment, based on monitored activity of the user and media characterizations by other users, the computer-implemented method comprising:
　outputting a first media file for playback for the user in the virtual environment, wherein the first media file is from a first media source that is part of a virtual world application providing the virtual environment;
　selecting, from the plurality of media files from a second media source that is not part of the virtual application, a second media file for playback to a user in a virtual environment, by operation of one or more computer processors and based on the monitored activity of the user in the virtual environment and based further on media characterizations of a plurality of media files, without requiring, from the user, any input specifying the second media file, wherein the media characterizations are specified by one or more users other than the user and via a media player application separate from the virtual world application, whereby selection of media is tailored for playback to the user in the virtual environment, based on media characterizations by other users;
　outputting the second media file for playback to the user in the virtual environment; and
　providing a user interface for controlling media playback, wherein the user interface is integrated into a virtual object in the virtual environment, wherein the user interface of the virtual object permits controlling playback of the plurality of media files without requiring use of the media player application, in order to reduce incidence of interruption of use the virtual environment.

14. The computer-implemented method of claim 13, wherein the plurality of media files resides on a portable media player device of the user, operatively connected to a computing device executing an application that provides the virtual environment, wherein the virtual object is a vehicle in the virtual environment, wherein the user interface is integrated into a dashboard of the vehicle.

15. A non-transitory computer-readable medium containing a program which, when executed, performs an operation to tailor selection of media for playback to a user of a virtual environment, based on monitored activity of the user and media characterizations by other users, the operation comprising:
　outputting a first media file for playback for the user in the virtual environment, wherein the first media file is from a first media source that is part of a virtual world application providing the virtual environment;
　monitoring activity of the user in the virtual environment, wherein the virtual environment includes a virtual object having a user interface for controlling media playback without requiring use of any media player application;
　retrieving media characterizations of a plurality of media files from a second media source that is not part of the virtual world application, wherein the media characterizations are input by a plurality of users other than the user and each using a respective media player application of one or more media applications for managing the plurality of media files and the media characterizations, wherein the respective media player application is separate from the virtual world application;
　selecting a second media file from the plurality of media files for playback to the user in the virtual environment, by operation of one or more computer processors when executing the program, and based on at least the monitored activity of the user and the retrieved media characterizations, without requiring, from the user, any input specifying the second media file, in order to tailor selection of media for playback to the user in the virtual environment;
　wherein playback of the plurality of media files is controllable via the user interface of the virtual object and without requiring use of any of the one or more media player applications, in order to reduce incidence of interruption of use the virtual environment.

16. The non-transitory computer-readable medium of claim 15, wherein the characterizations comprise at least one of a rating of a media file, a descriptive tag characterizing the media file, a genre identifier for the media file, an indicator of a relationship with another media file, and a playback frequency of the media file.

17. A non-transitory computer-readable medium containing a program which, when executed, performs an operation to provide a user interface integrated into a virtual environment and for controlling playback of external media of a user, the operation comprising:
　providing the virtual environment for the user by a virtual world application;
　outputting a first media file for playback for the user in the virtual environment, wherein the first media file is from a first media source that is part of the virtual world application;
　providing the user interface for controlling media playback, wherein the user interface is integrated into a virtual object in the virtual environment;
　receiving, from the user and via the user interface, a request to play a second media file from a second media source that is not part of the virtual world application;
　outputting the second media file for playback to the user in the virtual environment, responsive to the request and by operation of one or more computer processors when executing the program; and
　providing media characterizations of a plurality of media files from the second media source external to the virtual environment, wherein the media characterizations are input by a plurality of users other than the user and each using a respective media player application of one or more media applications for managing the plurality of media files and the media characterizations, wherein the respective media player application is separate from the virtual world application, wherein the user interface of the virtual object permits control of media playback without requiring use of any of the one or more media player applications, wherein a media file from the plurality of media files is selected for playback to the user in the virtual environment, based on monitored activity of the user and the provided media characterizations, without requiring, from the user, any input specifying the media file.

18. A system to tailor selection of media for playback to a user of a virtual environment, based on monitored activity of the user and media characterizations by other users, the system comprising:
  one or more computer processors; and
  a memory containing a program executable by the one or more computer processors to perform an operation comprising:
    outputting a first media file for playback for the user in the virtual environment, wherein the first media file is from a first media source that is part of a virtual world application providing the virtual environment;
    monitoring activity of the user in the virtual environment, wherein the virtual environment includes a virtual object having a user interface for controlling media playback without requiring use of any media player application;
    retrieving media characterizations of a plurality of media files from a second media source that is not part of the virtual world application, wherein the media characterizations are input by a plurality of users other than the user and each using a respective media player application of one or more media applications for managing the plurality of media files and the media characterizations, wherein the respective media player application is separate from the virtual world application; and
    selecting a second media file from the plurality of media files for playback to the user in the virtual environment, based on at least the monitored activity of the user and the retrieved media characterizations and without requiring, from the user, any input specifying the second media file, in order to tailor selection of media for playback to the user in the virtual environment;
    wherein playback of the plurality of media files is controllable via the user interface of the virtual object and without requiring use of any of the one or more media player applications, in order to reduce incidence of interruption of use the virtual environment.

19. The system of claim 18, wherein the characterizations comprise at least one of a rating of a media file, a descriptive tag characterizing the media file, a genre identifier for the media file, an indicator of a relationship with another media file, and a playback frequency of the media file, wherein the virtual world application is selected from the program and an application other than the program.

20. A system to provide a user interface integrated into a virtual environment and for controlling playback of external media of a user, the system comprising:
  one or more computer processors; and
  a memory containing a program executable by the one or more computer processors to perform an operation comprising:
    providing the virtual environment for the user;
    outputting a first media file for playback for the user in the virtual environment, wherein the first media file is from a first media source that is part of the virtual world application;
    providing the user interface for controlling media playback, wherein the user interface is integrated into a virtual object in the virtual environment;
    receiving, from the user and via the user interface, a request to play a second media file from a second media source that is not part of the program;
    outputting the second media file for playback to the user in the virtual environment, responsive to the request; and
    providing media characterizations of a plurality of media files from the second media source external to the virtual environment, wherein the media characterizations are input by a plurality of users other than the user and each using a respective media player application of one or more media applications for managing the plurality of media files and the media characterizations, wherein the respective media player application is separate from the program, wherein the user interface of the virtual object permits control of media playback without requiring use of any of the one or more media player applications, wherein a media file is selected from the plurality of media files for playback to the user in the virtual environment, based on monitored activity of the user and the provided media characterizations and without requiring, from the user, any input specifying the media file.

* * * * *